(12) United States Patent
Yang

(10) Patent No.: US 11,881,560 B2
(45) Date of Patent: Jan. 23, 2024

(54) LITHIUM BATTERY STRUCTURE AND ELECTRODE LAYER THEREOF

(71) Applicants: PROLOGIUM TECHNOLOGY CO., LTD., Taoyuan (TW); PROLOGIUM HOLDING INC., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 136 days.

(21) Appl. No.: 16/677,977

(22) Filed: Nov. 8, 2019

(65) Prior Publication Data

US 2020/0076004 A1  Mar. 5, 2020

Related U.S. Application Data

(63) Continuation-in-part of application No. 15/727,707, filed on Oct. 9, 2017, now abandoned.
(Continued)

(51) Int. Cl.
*H01M 10/0585* (2010.01)
*H01M 10/052* (2010.01)
(Continued)

(52) U.S. Cl.
CPC ....... *H01M 10/0585* (2013.01); *H01M 4/628* (2013.01); *H01M 4/667* (2013.01); *H01M 4/742* (2013.01); *H01M 10/052* (2013.01)

(58) Field of Classification Search
CPC .......... H01M 10/0585; H01M 10/052; H01M 4/628; H01M 4/667; H01M 4/742
See application file for complete search history.

(56) References Cited

U.S. PATENT DOCUMENTS 10,581,047 B2  3/2020  Park et al.
10,665,844 B2  5/2020  Yang
(Continued)

FOREIGN PATENT DOCUMENTS

KR  1020180040494 A  4/2018
KR  1020190048312 A  5/2019
(Continued)

OTHER PUBLICATIONS

Extended European Search Report dated Jul. 7, 2020 in Application No. 19217650.1.
(Continued)

*Primary Examiner* — Anca Eoff
(74) *Attorney, Agent, or Firm* — Rabin & Berdo, P.C.

(57) ABSTRACT

The invention discloses a lithium battery structure and the electrode layer thereof. The lithium battery structure includes two battery units with the two negative active material layers being disposed in face-to-face arrangement. The negative current collector includes a conductive substrate with a plurality of through holes and an isolation layer. The isolation layer is covered on one surface of the conductive substrate and extended along the through holes to another surface to cover the edge of the openings of the through holes. It can be effectively avoided the lithium dendrites depositing near the openings of the through holes on the conductive substrate. Also, the face-to-face arrangement of the negative active material layers is effectively control the locations of the plated lithium dendrites. Therefore, the safety of the battery and the cycle life of the battery is greatly improved.

16 Claims, 8 Drawing Sheets

Related U.S. Application Data

(60) Provisional application No. 62/407,019, filed on Oct. 12, 2016.

(51) Int. Cl.
  *H01M 4/62* (2006.01)
  *H01M 4/74* (2006.01)
  *H01M 4/06* (2006.01)
  *H01M 4/66* (2006.01)

(56) References Cited

U.S. PATENT DOCUMENTS

| | | | |
|---|---|---|---|
| 2010/0221614 A1* | 9/2010 | Bertin | C08J 3/20 |
| | | | 429/309 |
| 2016/0013515 A1* | 1/2016 | Lee | H01M 4/382 |
| | | | 429/126 |
| 2016/0020462 A1 | 1/2016 | Yang | |
| 2016/0064770 A1 | 3/2016 | Lee et al. | |
| 2016/0372780 A1* | 12/2016 | Sohn | H01M 10/0525 |
| 2017/0092921 A1 | 3/2017 | Matsumura et al. | |

FOREIGN PATENT DOCUMENTS

| | | | |
|---|---|---|---|
| KR | 1020190056848 A | 5/2019 | |
| KR | 1020190079171 A | 7/2019 | |
| WO | WO-2016010600 A1 * | 1/2016 | ........ H01M 10/0525 |
| WO | 2019072028 A1 | 4/2019 | |

OTHER PUBLICATIONS

Hou Zhen et al: "Towards high-performance lithium metal anodes via the modification of solid electrolyte interphases", Journal of Energy Chemistry, Elsevier, Amsterdam, NL, vol. 45, Oct. 1, 2019 (Oct. 1, 2019), pp. 7-17.

Marcinek M et al: "Electrolytes for Li-ion transport—Review", Solid State Ionics, vol. 276, Apr. 24, 2015 (Apr. 24, 2015), pp. 107-126.

Yu V Baskakova et al: "Polymer gel electrolytes for lithium batteries", Russian Chemical Reviews (Uspekhi Khimii)., vol. 81, No. 4, Apr. 30, 2012, pp. 367-380.

* cited by examiner

LITHIUM BATTERY STRUCTURE AND ELECTRODE LAYER THEREOF

CROSS REFERENCES TO RELATED APPLICATIONS

This application is a continuation-in-part (CIP) of U.S. patent application Ser. No. 15/727,707, filed on Oct. 9, 2017, which claims the benefit of the earlier filing date of provisional application No. 62/407,019, filed on Oct. 12, 2016. The prior applications are herewith incorporated by reference in their entirety.

BACKGROUND OF THE INVENTION

Field of Invention

The present invention relates to a lithium battery, in particular to a lithium battery structure having two electrode layers with the same polarity and face to face arrangement to control the regions for plating lithium dendrites to improve safety of using the battery.

Related Art

As for the conventional lithium battery, the most difficult problem is the formation of lithium dendrite. Since the current collector of anode electrode (usually copper foil) approaches the lithium relative potential in 0 volts state, in the internal electrochemical reaction of the battery, the lithium deposition is continued on the surface of the current collector, resulting in the formation of a large amount of lithium dendrite. The formation of lithium dendrite not only consumes the amount of lithium inside the battery, and the capacity decreases gradually after cycle times, but also might penetrate through the separator, once the separator damaged would result in the internal shortage or explosion.

A common way to solve the problem is adding additives in electrolyte. By adding different additives, the probability of lithium ion deposition is decreased. For example, reducing the activation energy of the formation of SEI (solid electrolyte interface) layer and avoiding the lithium deposition; or providing specific functional groups for forming lithium intermediates to interfere with the lithium deposition. Furthermore, specific anode electrode active material, for example, lithium titanium oxide (LTO), is used to avoid the potential (measured versus lithium) of the anode electrode active material becoming close to 0 volts while in the process of charging. Therefore, such specific anode electrode active material is used to avoid lithium deposition on the anode electrode layer. However, the above-mentioned methods have some hindrance to the lithium deposition, the use of additives in the electrolyte is usually accompanied with the occurrence of some side effects. Therefore, the lithium deposition is reduced, but some of the side effects will reduce the efficiency of the internal electrochemical reaction of the battery. In addition, the lithium titanium oxide potential is higher than the oxide potential of lithium about 1.5 volts, when using lithium titanium oxide as the active material of anode and using the existed cathode material, the discharge voltage of the battery will be reduced to about 2.4V. Under the premise that the theoretical capacitance of lithium titanium oxide is comparable to that of graphite, the energy density provided by the lithium titanium oxide battery will be sacrificed.

Accordingly, a lithium battery structure with the two electrodes corresponding arrangement while maintaining a high energy density is disclosed in the present invention to overcome the above problems.

SUMMARY OF THE INVENTION

It is an objective of this invention to provide a lithium battery structure having two active material layers with the same polarity and face to face arrangement. Therefore, the lithium dendrite is limited to be plated between the two active material layers to avoid the plated lithium dendrite penetrating through the separator.

Also, it is another objective of this invention to provide a lithium battery structure, which has two conductive substrates with face to face arrangement. The conductive substrate includes a conductive area to dispose the active material layer, a surface insulating area covered by the isolation layer and a plurality of through holes filled with the electrolyte.

It is an objective of this invention to provide a lithium battery structure. By the face-to-face arrangement of the two negative active material layers and the location of the isolation layer, the plated lithium dendrites toward to the separator within the through holes are decreased and the change of the plated lithium dendrites penetrating through the separator is reduced. Also, the lithium dendrites are controlled to be plated between the area between the two active material layers with the same polarity. Therefore, the lithium dendrites can be used as lithium supplying source to decrease the consumption of the lithium ions within the battery to increase usable cycle times of the battery.

It is an objective of this invention to provide a lithium battery structure, wherein an ion guiding layer is disposed between the two active material layers with the same polarity. The ion guiding layer is made of an ion-transmission material and a base material capable of impregnating the ion-transmission material. The base material includes particle or fiber structure materials to form pores with high surface areas thereof. The electrolyte is continuously and uniformly guided to the active material layers with the same polarity by attaching to the high surface areas of the pores to improve the efficiency of the ion exchange. Also, the lithium dendrite plates and strips inside the pores of the ion guiding layer. During plating, the lithium dendrite attaches to the particle or the fiber structure of the ion guiding layer to form the solid electrolyte interface (SEI) for protection of the lithium metal to decrease the capacity loss of the battery.

In order to implement the abovementioned, this invention discloses a lithium battery structure, which includes a first and a second battery units. Each of the battery units includes a first current collector, a first active material layer, a second active material layer and a second current collector. The first current collector includes a conductive substrate with a plurality of through holes and an isolation layer. The isolation layer is disposed on the first surface of the conductive substrate and covers the sidewalls of the through holes to extend to the edge of the openings of the through holes parts on the second surface. The first active material layer is disposed on an uncovered area of the second surface. The second active material layer and the second current collector are sequentially disposed thereon. The first and the second battery units are essentially disposed face-to-face with the first active material layers facing each other. Therefore, the lithium dendrites are limited to be plated therebetween to control the plated areas of the lithium dendrites. The isolation layer is formed to extend to the edge of the openings of the through holes to reduce the chance of lithium dendrites depositing in the through holes and toward to the separator.

The problems of the internal shortage and the decreased safety of the battery caused by the lithium dendrites would be eliminated.

Moreover, the ion guiding layer is disposed between the two first active material layer of the first and the second battery units and extends to the through holes. The electrolyte is continuously and uniformly guided to the first active material layers to improve the efficiency of the ion exchange. Also, the ion guiding layer serves as the support structure to provide support for the SEI during plating/stripping of the lithium metal. Therefore, the continuous forming of the SEI is reduced to decrease the capacity loss of the battery.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
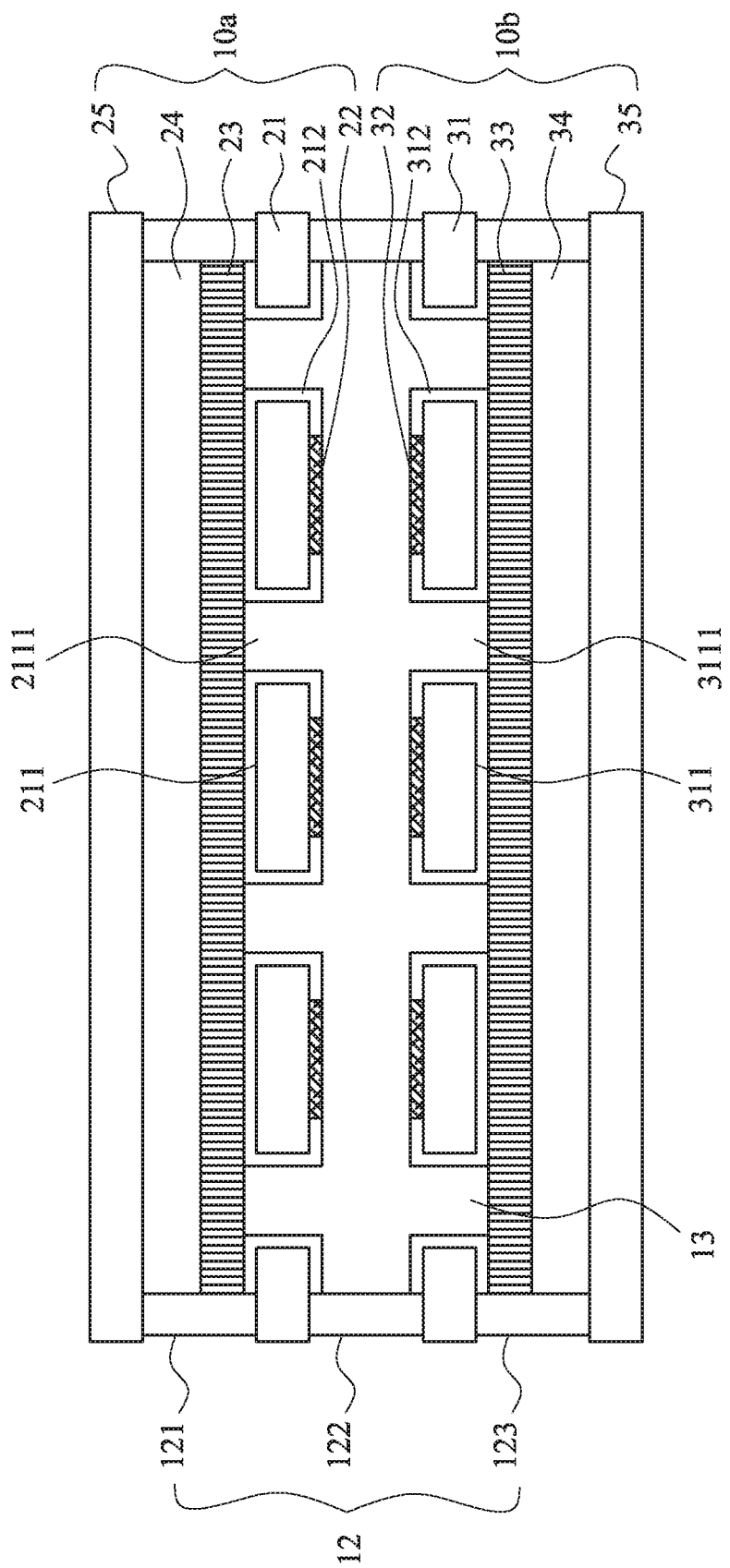
FIG. 1 is a schematic diagram of the lithium battery structure of this invention.

Please refer to FIG. 1, which is a schematic diagram of the lithium battery structure of this invention. The lithium battery structure includes two battery units, i.e. a first battery unit 10a and a second battery unit 10b. The first battery units 10a includes a first current collector 21, a first active material layer 22, a separator 23, a second active material layer 24 and a second current collector 25. The second battery units 10b includes a first current collector 31, a first active material layer 32, a separator 33, a second active material layer 34 and a second current collector 35.

Figure 2A:
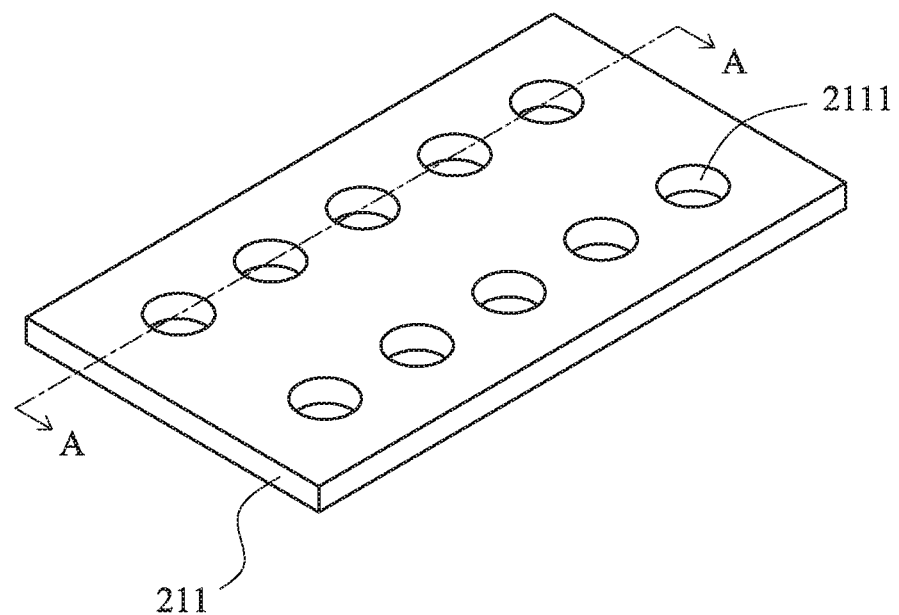
FIG. 2A is a schematic diagram of the first current collector of the lithium battery structure of this invention.
Figure 2B:
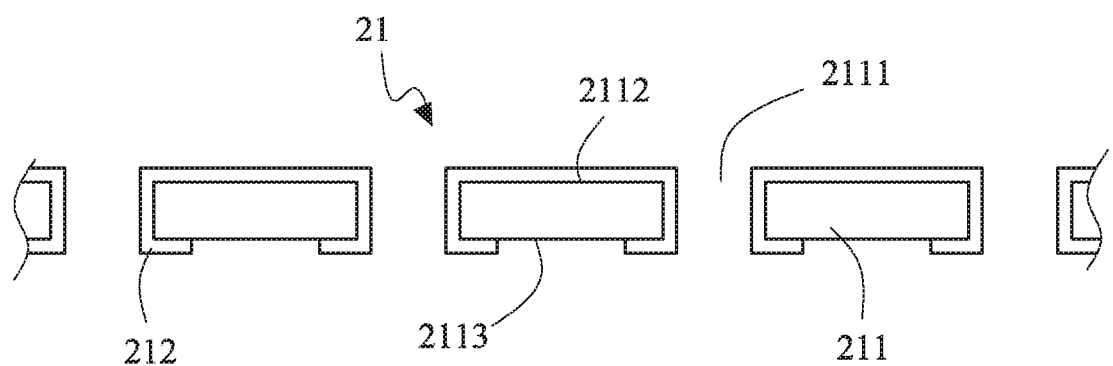
FIG. 2B is a cross-sectional view taken along line A-A of FIG. 2A thereof.

First, the first current collectors 21, 31 will be described, please refer to FIGS. 2A and 2B. FIG. 2A is a schematic diagram of the first current collector of the lithium battery structure of this invention. FIG. 2B is a cross-sectional view taken along line A-A of FIG. 2A thereof. In FIGS. 2A and 2B, the first current collector 21 of the first battery unit 10a is illustrated. The first current collector 21 includes a conductive substrate 211 and an isolation layer 212. The conductive substrate 211 is made of copper, nickel, iron, gold, zinc, silver, titanium or a combination thereof, or lithium-unalloyable materials. The conductive substrate 211 has a first surface 2112 and a second surface 2113 opposite and parallel to the first surface 2112. The conductive substrate 211 further includes a plurality of through holes 2111, extended from the first surface 2112 to the second surface 2113. The isolation layer 212 is disposed on the first surface 2112 of the conductive substrate 211 and covers the sidewalls of the through holes 2111 to extend to the surface near to the edge of the openings of the through holes 2111 on the second surface 2113. As showing in FIG. 2B, the isolation layer 212 is disposed on the first surface 2112 of the conductive substrate 211 and essentially covers completely the first surface 2112 and sidewalls of the through holes 2111, and extends to cover parts, which is near to the opening of the through holes 2111, of the second surface 2113 to form the first current collectors 21.

The isolation layer 212, 312 is made of insulation ceramic materials, such as insulation polymer material, insulation ceramic material, insulation glass material, insulation glass fiber material and any combinations thereof. The insulation polymer material includes polyimide, polyethylene terephthalate, polyurethane, polyacrylate, epoxy or silicone. The insulation glass fiber material is FR4-class epoxy glass fiber material.

Figure 2C:
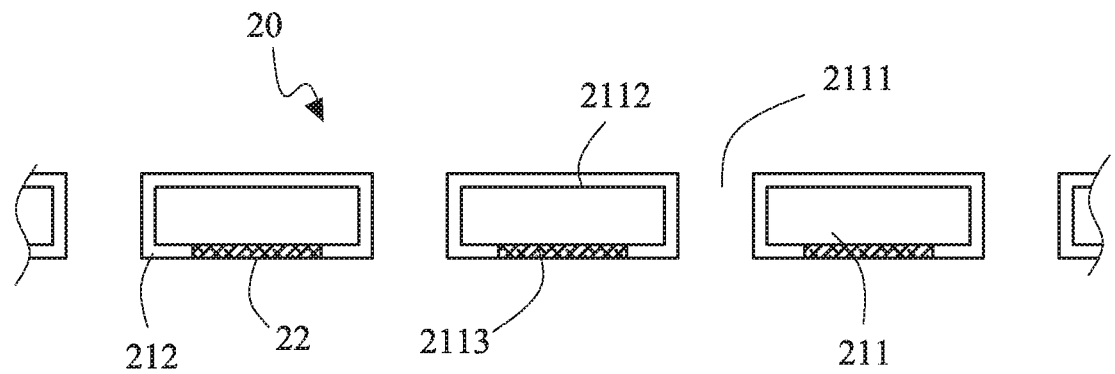
FIG. 2C is a schematic diagram of the electrode layer of the lithium battery structure of this invention.

The first active material layer 22 is disposed on an uncovered area by the isolation layer 212 of the second surface 2113 of the first current collector 21. Therefore, the first active material layer 22 is directly contacted to the first current collector 21, referring to FIG. 2C. Generally speaking, the first active material layer 22 is made of a negative material, such as a lithium metal or a lithium alloy, which is coated or pasting thereon. Moreover, the first active material layer 22 may be a carbon, a silicon oxide, or a combination thereof. The first current collector 31, which is composed of the conductive substrate 311 with a plurality of through holes 3111 and the isolation layer 312, of the second battery unit 10b is the same as that of the previous embodiment for the first current collector 21 of the first battery unit 10a. Thus, a repeated description will be omitted.

As shown in FIG. 1, the separator 23 is disposed on the first current collector 21 of the first battery unit 10a. The second active material layer 24 and the second current collector 25 are sequentially disposed thereon. Also, the separator 33 is disposed below the first current collector 31 of the second battery unit 10b. The second active material layer 34 and the second current collector 35 are sequentially disposed thereunder. The ion guiding layer 13 is disposed between the two first current collectors 21, 31. The ion guiding layer 13 is further extended into the through holes 2111 of the first current collector 21 of the first battery unit 10a, and the through holes 3111 of the first current collector 31 of the second battery unit 10b.

The ion guiding layer 13 may be essentially only made of an ion-transmission material, or may be made of an ion-transmission material and a base material capable of impregnating the ion-transmission material.

The ion guiding layer 13 (main part) may be made of an ion-transmission material and a base material capable of impregnating the ion-transmission material. The ion-transmission material essentially is a liquid electrolyte, a gel electrolyte, an ionic liquid, an ionic liquid electrolyte, an adjusting material for contact surfaces (detailed description below) or a combination thereof. The above materials are belong to the deformable or impregnable materials. The ion guiding layer 13 may also further include a small amount of oxide-based solid electrolyte. The "few amount" means that is much less than the main part in volume or mass, as will be described in more detail below. The packaging structure 12 is disposed between the second current collector 25 of the first battery unit 10*a* and the second current collector 35 of the second battery unit 10*b* to package the whole battery structure.

Figure 4:
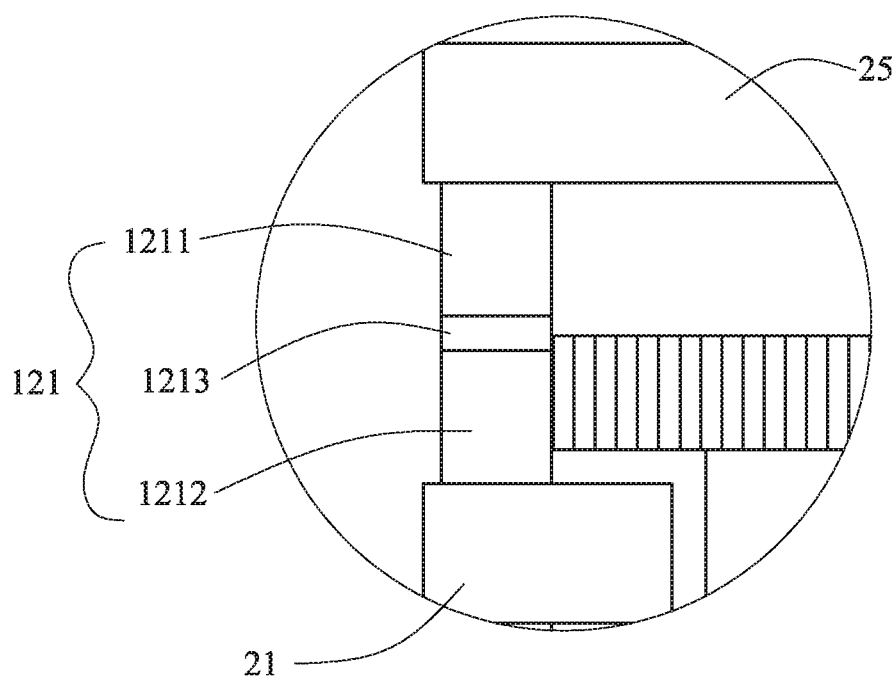
FIG. 4 shows a partial enlargement of the package structure in FIG. 3.
Figure 3:
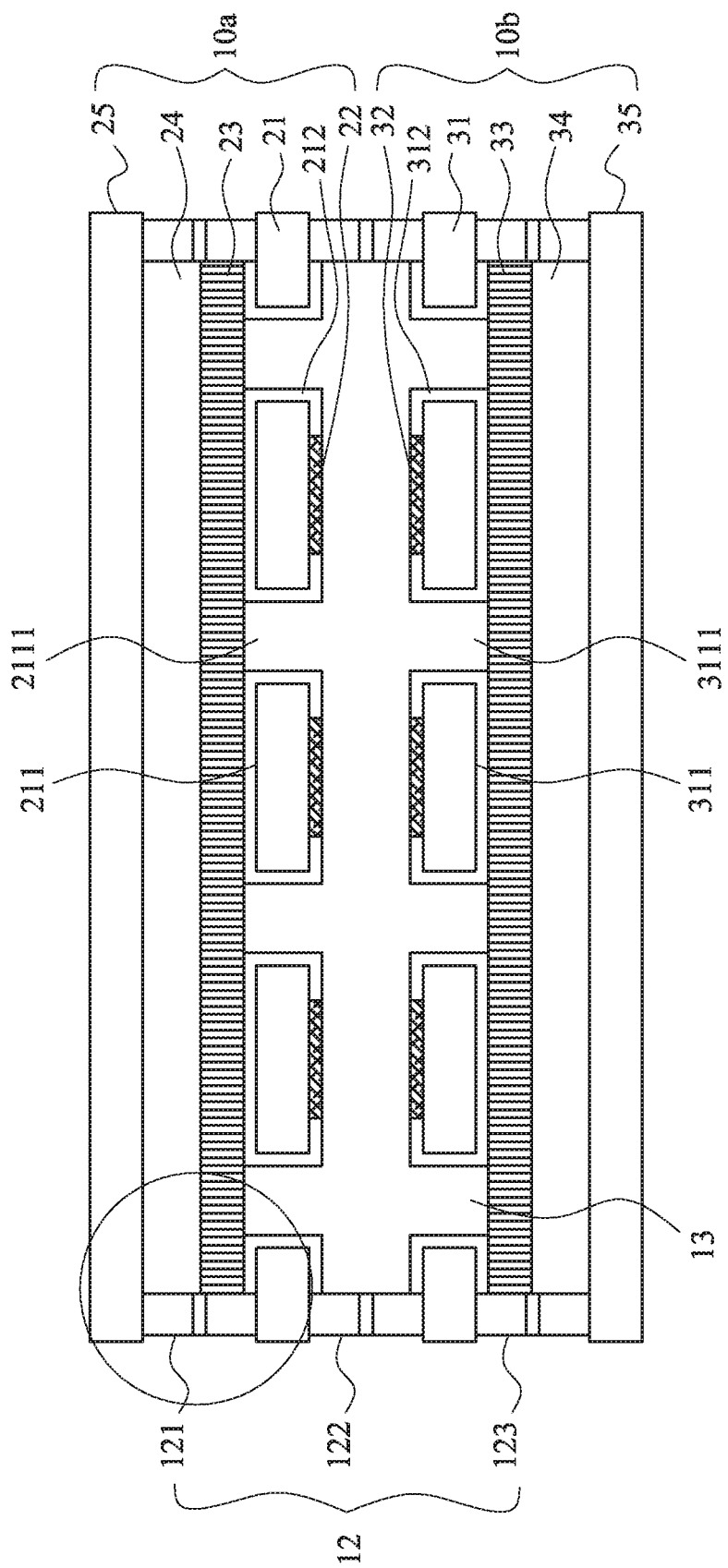
FIG. 3 is a schematic diagram of another embodiment of the lithium battery structure of this invention.

The arrangement of the packaging structure 12 is varied depended on the formation of the first current collectors 21, 31. As shown in FIG. 1, the first current collector 21 of the first battery unit 10*a* and the first current collector 31 of the second battery unit 10*b* are extended in both sides. The packaging structure 12 is divided into three segments, which are the first package body 121 located between the second current collector 25 and the first current collector 21 of the first battery unit 10*a*, the second package body 122 located between the first current collector 21 of the first battery unit 10*a* and the first current collector 31 of the second battery unit 10*b*, and the third package body 123 located between the first current collector 31 and the second current collector 35 of the second battery unit 10*b*. The first package body 121, the second package body 122 and the third package body 123 are surrounding frame structure to seal the sides of the first battery unit 10*a* and the second battery unit 10*b*. Excepting for the above-mentioned single layer structure, in another embodiment of this invention, all the first package body 121, the second package body 122 and the third package body 123 of the packaging structure 12 are three-layered structure. Please refer to FIGS. 3 and 4, taking the first package body 121 as an example, the first package body 121 includes a silicone layer 1213 and two modified silicone layers 1211, 1212 located on both sides of the silicone layer 1213. The modified silicone layers 1211, 1212 are modified by adjusting a proportion of condensation-type silicone or addition-type silicone, or by adding epoxy, acrylic acid or a combination thereof into silicone to enhance the adhesion for different materials, i.e. the second current collector 25, the first current collector 21 and the silicone layer 1213. The interfacial tension and the polarity of silicone are modified thereby. Also, the overall appearance is more complete and the production yield is improved. Furthermore, the ability of blocking moisture infiltrating from the first package body 121 is improved. Internally, the silicone body can prevent the damage of polar solvents and plasticizers, and the overall package structure is more complete. The second package body 122 and the third package body 123 are the same as that of the previous embodiment for the first package body 121. Thus, a repeated description will be omitted.

Figure 5:
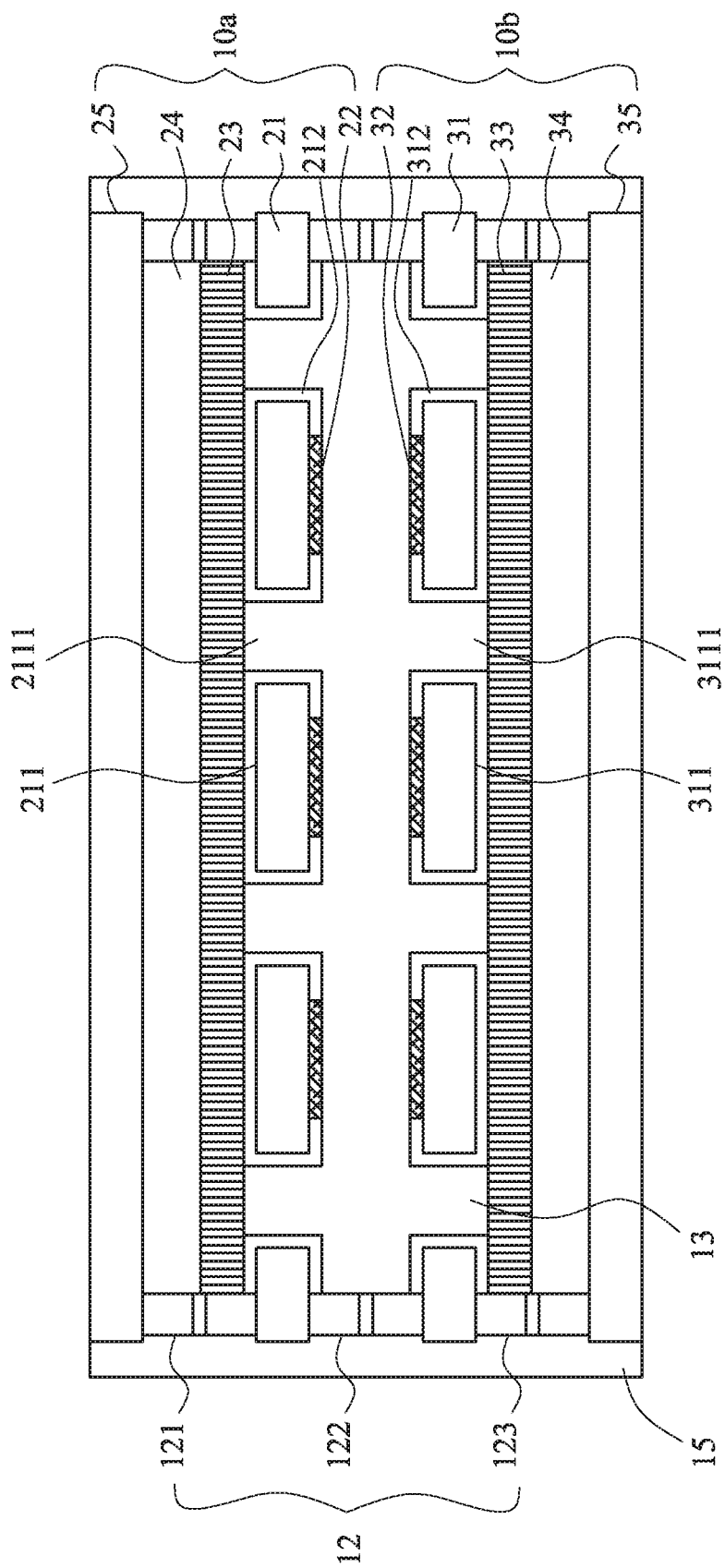
FIG. 5 is a schematic diagram of another embodiment of the lithium battery structure of this invention.

Please refer to FIG. 5, there may have an outer packaging structure 15 outside the packaging structure 12. By this dual-frame structure, the ability of blocking moisture and oxygen for the lithium battery structure is better. The outer packaging structure 15 may have the same or different materials or arrangement with the packaging structure 12.

Please refer to FIG. 1, the first battery unit 10*a* and the second battery unit 10*b* are essentially face-to-face disposed to each other by the first active material layers 22, 32. In other word, the uncovered area, by the isolation layer 212, of the first current collector 21 of the first battery unit 10*a* is faced to the uncovered area, by the isolation layer 312, of the first current collector 31 of the second battery unit 10*b*. Generally speaking, in the case of lithium batteries, the first active material layer 22, 32 and the first current collector 21, 31 are the negative electrode. The second active material layer 24, 34 and the second current collector 25, 35 are the positive electrode. Therefore, the isolation layers 212 of the first current collectors 21, 31 can avoid the electrical contacting with surface near the openings. It can be effectively reduce the lithium dendrites deposition during the electrical-chemical reaction of the battery. Also, the first battery unit 10*a* and the second battery unit 10*b* are face-to-face disposed to each other by the first active material layers 22, 32. Therefore, the lithium dendrites are limited to be plated between the first active material layers 22, 32 to avoid the plated lithium dendrite penetrating through the separator 23, 33. Moreover, the lithium dendrites are controlled to be plated between the first active material layers 22, 32. Thus, the lithium dendrites can be used as lithium supplying source to decrease the consumption of the lithium ions within the battery to increase usable cycle times of the battery. Furthermore, the suppressed stress may be provided by the formed lithium dendrites to avoid forming more lithium dendrites.

In this embodiment, the distance between the first active material layer 22 of the first battery unit 10*a* and the first active material layer 32 of the second battery unit 10*b* is 5-100 micrometer.

Moreover, by the characteristic of the electrical insulation of the isolation layers 212, 312, the lithium ions would not deposit centrally close to the openings of the through holes during the electrical-chemical reaction of the battery. Accordingly, the lithium dendrites are not formed inside the through holes 2111, 3111 and grow towards the separators 23, 33. The position and the amount of the plated lithium dendrites can be effectively controlled to solve the problems of the internal shortage and decreased safety of the battery.

The base material of the ion guiding layer 13 is porous and capable of impregnating the ion-transmission material. The base material is made of a polymer material, a ceramic material, a glass material, fiber material or a combination thereof. Also, the base material is porous via the particle materials stacking or the fiber materials crossing to form the pores. The particle materials include ceramic particles, polymer particles or glass particles. The fiber materials include polymer fibers or glass fibers.

The surfaces of the particle materials or the fiber materials are treated to have either negative or positive surface charges. For example, when the surfaces of the pores have positive surface charges, the electric double layer effect is reduced and the polarization of lithium ion migration is also reduced. When the surfaces of the pores have negative surface charges, the distribution of the lithium ions is more uniform.

Due to the material having pores formed by the particle materials or the fiber materials, the lithium dendrite plates and strips inside the pores of the base material. During plating, the lithium dendrite attaches to the particles or the fibers to enhance the strength of the solid electrolyte interface (SEI). Comparing to the SEI's thickness, around 10-50 nanometers, the volume changes of plating/stripping, 15-20 microns, of the lithium dendrites are too violent and the SEI will be seriously damaged during plating and/or stripping of the lithium dendrite without providing the supporting. The lithium ion concentration would be consumed and lead to the reversible capacity loss of the battery. Therefore, the particle materials or the fiber materials structure of the base material can provide support for the SEI to decrease the capacity loss of the battery. Under certain conditions, parts of the particle materials or the fiber materials may be involved with the reaction of forming the SEI. Therefore, the continuous forming of the SEI is reduced to decrease the capacity loss of the battery.

Moreover, by the surface tension of the particle materials or the fiber materials structure of the base material, the electrolyte is continuously and uniformly guided to the first active material layers 22, 32 to improve the efficiency of the ion exchange. The surfaces of the particle materials or the fiber materials are treated to have either negative or positive surface charges to make the distribution of the electrolyte be more uniform. When the surfaces of the pores have positive surface charges, the polarization of lithium ion migration is reduced. When the surfaces of the pores have negative surface charges, the distribution of the lithium ions is more uniform, and the lithium dendrites are tended to undirected growth.

Figure 6:
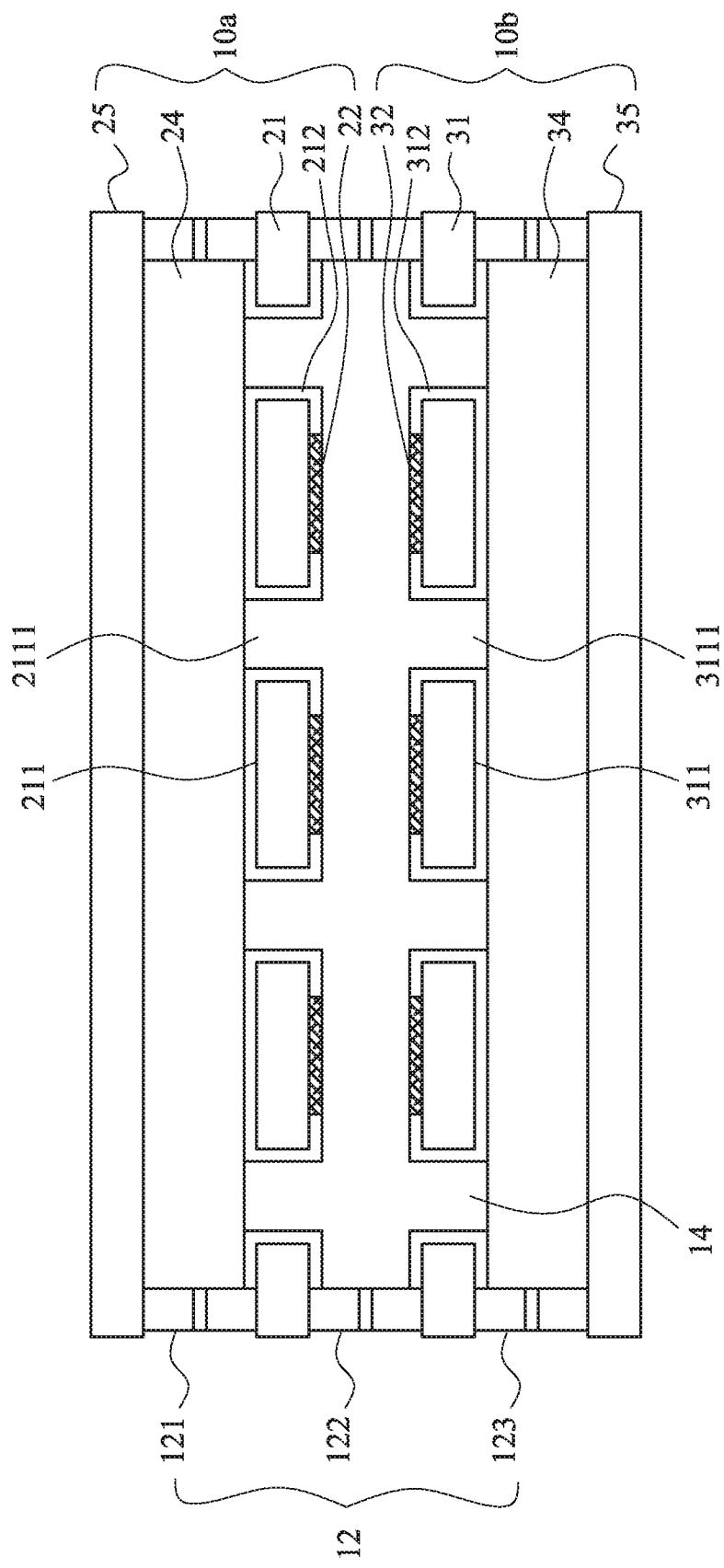
FIG. 6 is a schematic diagram of another embodiment of the lithium battery structure of this invention.

Furthermore, it is considered that the material of the ion guiding layer 13 is essentially an insulating material, which can prevent the short circuit between the positive and negative current collectors from contacting each other. The separators 23, 33 can be omitted, please refer to FIG. 6.

Figure 7:
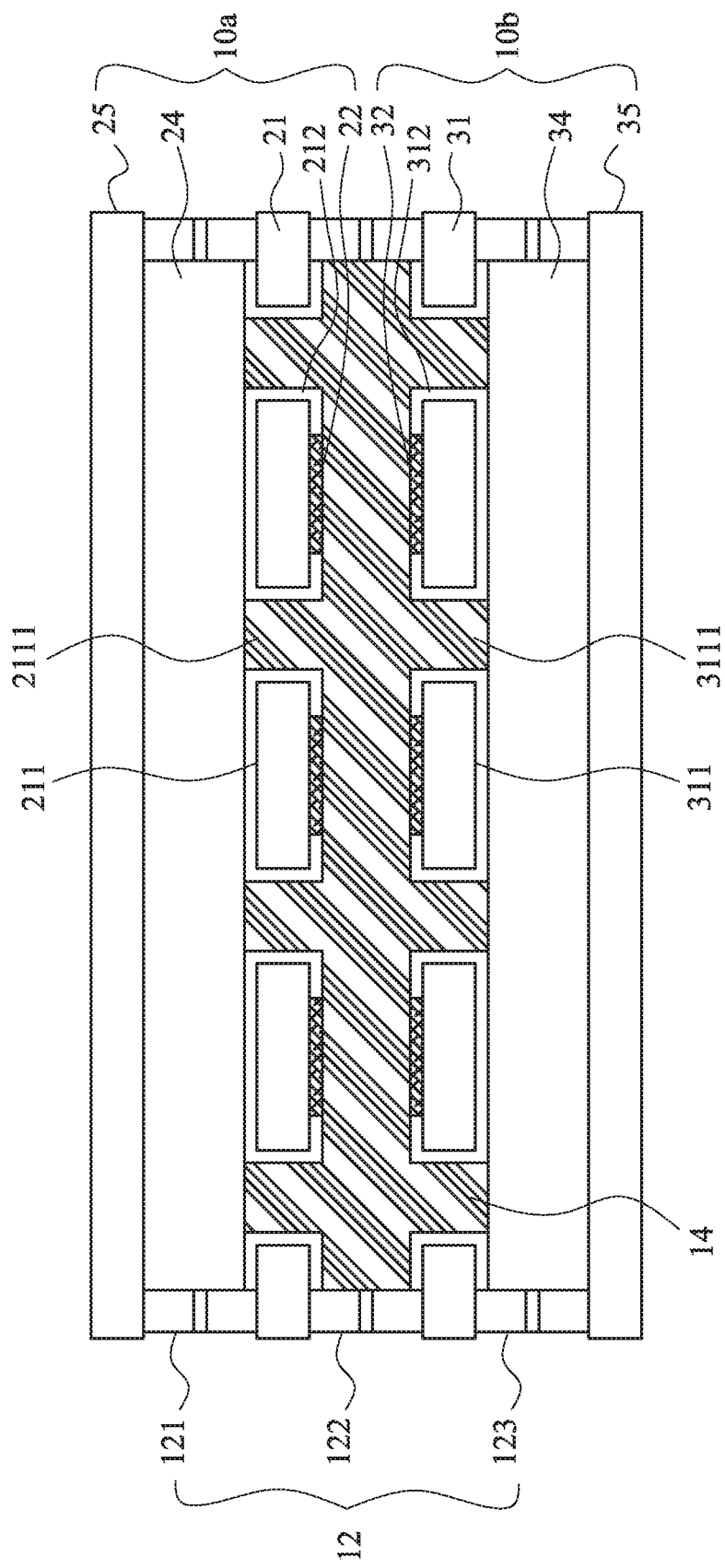
FIG. 7 is a schematic diagram of another embodiment of the lithium battery structure of this invention.

Then, the following embodiment is related to the ion guiding layer 13, which is only made of an ion-transmission material. FIG. 7 is a schematic diagram of the lithium battery structure of this invention. Since some components of FIG. 7 are the same as those of the above-described example embodiments in FIG. 1, a repeated description thereof will be omitted. The main difference between FIG. 1 and FIG. 7 is the ion guiding layer does not contain the above mentioned base material. The main body of the ion-transmission material is the inorganic solid electrolyte, such as an oxide-based solid electrolyte or a sulfide-based solid electrolyte, with poor deformation ability, i.e. better stress tolerance. This ion guiding layer is labeled as the inorganic solid electrolyte layer 14 in the FIG. 7. Also, the outer surfaces of the first current collectors 21, 31 are cover by the isolation layers 212, 312. When the battery is bent, the problem of the short circuit would not be occurred result from the positive and negative current collectors being contacted each other. Therefore, the separators 23, 33 can be omitted. In another embodiment, the inorganic solid electrolyte layer 14 may further include a few amount of a liquid electrolyte, a gel electrolyte, an ionic liquid, an ionic liquid electrolyte or a combination thereof. The electrolyte may be distributed more uniform and the problem of the high interface resistances between the inorganic solid electrolytes can be solved. Also, in FIG. 7, the first package body 121, the second package body 122 and the third package body 123 of the packaging structure 12 may be single layer or three-layered structure. Since these components of FIG. 7 are the same as those of the above-described example embodiments in FIG. 4, a repeated description thereof will be omitted.

When the problems of the high interface resistances caused by the poor contact between the inorganic solid electrolytes are considered, an adjusting material for contact surfaces may be coated on the inorganic solid electrolyte particles, or disposed between the inorganic solid electrolytes. Therefore, a surface to surface ion transfer path between the inorganic solid electrolytes would be formed by the adjusting material. The adjusting material is mainly composed of a polymer substrate capable of transmitting lithium ions inside the material and an additive material capable of dissociating the lithium salt and being used as a plasticizer.

The polymer substrate capable of transmitting lithium ions inside the material means that the material does not contain lithium ions of the material itself or during the beginning of the electrochemical reaction, but the lithium ions can be transferred. For example, the polymer substrate may be linear structure material without salts, such as PEO. Also, excepting for transferring the lithium ions, the polymer substrate may be cross-linked structure to enhance mechanical strength of the film formed by the polymer substrate. The polymer substrate with cross-linked structure may be poly(ethylene glycol)diacrylate (PEGDA), poly(ethylene glycol)dimethacrylate (PEGDMA), poly(ethylene glycol) monomethylether (PEGME), poly(ethylene glycol) dimethylether (PEGDME), poly[ethylene oxide-co-2-(2-methoxyethoxy)ethyl glycidyl ether] (PEO/MEEGE), or hyperbranched polymers, such as poly[bis(triethylene glycol)benzoate, or polynitriles, such as polyacrylonitrile (PAN), poly(methacrylonitrile) (PMAN), poly(N-2-cyano-ethyl)ethyleneamine) (PCEEI).

On the other hand, the adjusting material may further comprise a crystallization inhibition material and an ion supply material. The ion supply material may be a lithium salt, such as LiTFSI, LiFSI, LiBF$_4$, LiPF$_6$, to increase the concentration of the lithium ions. The crystallization inhibition material is used to reduce the crystallinity, such as poly(ethyl methacrylate) (PEMA), poly(methyl methacrylate) (PMMA), poly(oxyethylene), poly (cyanoacrylate) (PCA), polyethylene glycol (PEG), poly(vinyl alcohol) (PVA), polyvinyl butyral (PVB), poly(vinyl chloride) (PVC), PVC-PEMA, PEO-PMMA, poly(acrylonitrile-co-methyl methacrylate) (P(AN-co-MMA)), PVA-PVdF, PAN-PVA, PVC-PEMA, polycarbonates, such as poly(ethylene oxide-co-ethylene carbonate) (PEOEC), polyhedral oligomeric silsesquioxane (POSS), polyethylene carbonate (PEC), poly (propylene carbonate) (PPC), poly(ethyl glycidyl ether carbonate) (P(Et-GEC)), poly(t-butyl glycidyl ether carbonate)(P(tBu-GEC)), cyclic carbonates, such as poly (trimethylene carbonate) (PTMC), polysiloxane-based, such as polydimethylsiloxane (PDMS), poly(dimethyl siloxane-co-ethylene oxide) (P(DMS-co-EO)), poly(siloxane-g-ethyleneoxide), polyesters, such as ethylene adipate, ethylene succinate, ethylene malonate. Furthermore, it may also be poly(vinylidenedifluoridehexafluoropropylene) (PvdF-HFP), poly(vinylidenedifluoride) (PvdF), or poly(ε-caprolactone) (PCL).

The additive material is used as a plasticizer and dissociates the lithium salt, which may be plastic crystal electrolytes (PCEs), such as succinonitrile (SN) [ETPTAIISN; PEO/SN; PAN/PVA-CN/SN]), N-ethyl-N-methylpyrrolidinium, [C2mpyr]+AnionsN, N-diethyl-pyrrolidinium, [C2epyr], quaternary alkylammonium, n-alkyltrimethylphosphonium, [P1,1,1,n], decamethylferro-cenium, [Fe $(C_5Me_5)_2$]), 1-(N,N-dimethylammonium)-2-(ammonium) ethane triflate ([DMEDAH2] [Tf]2, Anions=[FSI], [FSA], [CFSA], [BETA]), LiSi$(CH_3)_3SO_4$, trimethy(lithium trimethylsilyl sulfate), or ionic liquid, may be imidazolium, such as anion/bis(trifluoromethanesulfonyl)imide), anion/bis (fluorosulfonyl)imide, anion/trifluoromethanesulfonate, or ammonium, such as anion/bis(trifluoromethanesulfonyl) imide, or pyrrolidinium, such as anion/bis(trifluoromethanesulfonyl)imide, anion/bis(fluorosulfonyl)imide, or piperidinium, such as anion/bis(trifluoromethanesulfonyl)imide, anion/bis(fluorosulfonyl)imide.

The adjusting material may further comprise the second additive, such as a nanoscale inactive ceramic material (non-electrolyte oxide), a nanoscale inorganic solid electrolyte, or a conductive material. When the second additive is the inactive ceramic material, the used amount of the polymer substrate and the additive can be reduced. Further, the film-forming ability of the adjusting material is improved and the inactive ceramic material is used as a film—reinforcement material. The material may be the silicon dioxide. When the second additive is the nanoscale inorganic solid electrolyte, the used amount of the polymer substrate and the additive can be reduced and a high rate ion transfer path is provided. The inorganic solid electrolyte may be an oxide-based solid electrolyte, a sulfide-based solid electrolyte or any other inorganic solid electrolyte. For example, when the ion transfer occurs in the adjusting material, the ions may be transmitted via the adjusting material, or via the nanoscale inorganic solid electrolyte once contacting the nanoscale inorganic solid electrolyte.

Moreover, the content of the adjusting material is higher when close to the first and the second active material layer 22, 32, 24, 34. Therefore, the low-frequency transmission requirement close to the active materials is meet. The requirement far away from the active materials is high frequency transmission. Therefore, the content of the solid electrolyte is higher.

Also, when the ion guiding layer is composed of the ion-transmission material only, the ion-transmission material may be composed of the above mentioned adjusting material and an ion supply material, or further mixed with the crystallization inhibition material.

Figure 8:
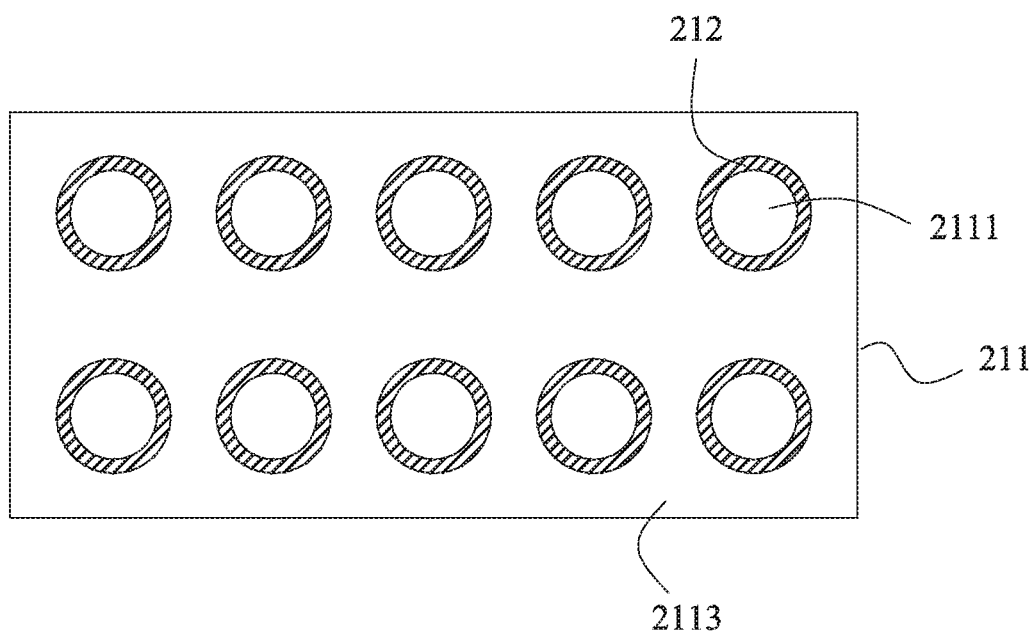
FIG. 8 is a schematic diagram of the first current collector of the lithium battery structure of this invention.

For clearly describing the face-to-face arrangement of the first active material layers 22 of the first battery unit 10a and the first active material layers 32 of the second battery unit 10b, please refer to FIGS. 8 and 2B. FIG. 8 is a schematic diagram of the first current collector of the lithium battery structure of this invention. The isolation layer 212 is disposed to completely cover the first surface 2112, and extend along the sidewalls of the through holes 2111 to the edge of the openings of the through holes 2111 on the second surface 2113. Therefore, the uncovered area of the second surface 2113, by the isolation layer 212, of the first current collector 21 are the regions outside the edge of the openings of the through holes 2111 on the second surface 2113. The first active material layer 22 is disposed on this area. The first active material layers 22 of the first battery unit 10a and the first active material layers 32 of the second battery unit 10b are disposed face-to-face to control the lithium dendrites plated therebetween. Therefore, the face-to-face arrangement makes the lithium dendrites tend to plate between the first active material layers 22, 32. The invention is not limited that the distribution and the arrangement of the first active material layers 22 of the first battery unit 10a and the first active material layers 32 of the second battery unit 10b have to be the same. The relative location, the distribution or the patterns may be modified or varied. The control for growth trend of the lithium dendrites is still achieved.

Accordingly, in this invention, the two negative active material layers are disposed in face-to-face arrangement to effectively control the locations of the plated lithium dendrites. Therefore, the safety of the battery and the cycle life of the battery is greatly improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A lithium battery structure, comprising:
a first and a second battery units, each of the battery units including a first current collector, a first active material layer, a second active material layer and a second current collector, wherein the first current collector comprises:
a conductive substrate, having a first surface, a second surface opposite and parallel to the first surface and a plurality of through holes extended from the first surface to the second surface; and
an isolation layer, disposed on the first surface of the conductive substrate and essentially covering completely the first surface and sidewalls of the through holes, and extending to cover parts of the second surface;
wherein the first active material layer is disposed on an uncovered area of the second surface, and the second active material layer and the second current collector sequentially disposed on the first surface of the conductive substrate completely covered by the isolation layer;
wherein the first and the second battery units are essentially face-to-face disposed to each other by the first active material layers;
an ion guiding layer, disposed between the first active material layers of the first and the second battery units; and
a packaging structure, disposed between the second current collectors of the first and the second battery units to package the first and the second battery units;
wherein
the ion guiding layer extends into the through holes of the conductive substrate;
the ion guiding layer is made of an ion-transmission material and a base material capable of impregnating the ion-transmission material;
the base material is porous and made of a polymer material, a ceramic material, a glass material, fiber material or a combination thereof;
the packaging structure includes a first package body sandwiched between the second current collector and the first current collector of the first battery unit, a second package body sandwiched between the first current collector of the first battery unit and the first current collector of the second battery unit, and a third package body sandwiched between the first current collector and the second current collector of the second battery unit;
the first current collectors of the first and the second battery units and the second package body form an enclosed space for depositing the ion guiding layer therein; and
a distance between the first active material layers of the first and the second battery units is 5-100 micrometers.

2. The lithium battery structure of claim 1, wherein a material of the isolation layer is insulation polymer material, insulation ceramic material, insulation glass material, insulation glass fiber material or a combination thereof.

3. The lithium battery structure of claim 2, wherein the insulation polymer material includes polyimide, polyethylene terephthalate, polyurethane, polyacrylate, epoxy and silicone, and the insulation glass fiber material includes FR4-class epoxy glass fiber material.

4. The lithium battery structure of claim 1, wherein the base material is porous via particle materials stacking or the fiber material crossing.

5. The lithium battery structure of claim 1, wherein the ion-transmission material is a liquid electrolyte, a gel electrolyte, an ionic liquid, an ionic liquid electrolyte or a combination thereof.

6. The lithium battery structure of claim 1, wherein the ion-transmission material is made of an adjusting material for contact surfaces and a dissociable lithium salt, and the adjusting material is mainly composed of a polymer substrate capable of transmitting metallic ions inside the polymer substrate and an additive material capable of dissociating the lithium salt and being served used as a plasticizer.

7. The lithium battery structure of claim 6, wherein the adjusting material further includes a crystallization inhibition material.

8. The lithium battery structure of claim 1, wherein the first and the second battery units further include a separator respectively, and the separator is disposed between the second active material layer and the first current collector.

9. A lithium battery structure, comprising:
a first and a second battery units, each of the battery units including a first current collector, a first active material layer, a second active material layer and a second current collector, wherein the first current collector comprises:
  a conductive substrate, having a first surface, a second surface opposite and parallel to the first surface and a plurality of through holes extended from the first surface to the second surface; and
  an isolation layer, disposed on the first surface of the conductive substrate and essentially covering completely the first surface and sidewalls of the through holes, and extending to cover parts of the second surface;
  wherein the first active material layer is disposed on an uncovered area of the second surface, and the second active material layer and the second current collector sequentially disposed on the first surface of the conductive substrate completely covered by the isolation layer;
wherein the first and the second battery units are essentially face-to-face disposed to each other by the first active material layers;
an ion guiding layer, disposed between the first active material layers of the first and the second battery units; and
  a packaging structure, disposed between the second current collectors of the first and the second battery units to package the first and the second battery units;
wherein
  the ion guiding layer extends into the through holes of the conductive substrate;
  the ion guiding layer is essentially only made of an ion-transmission material;
  the packaging structure includes a first package body sandwiched between the second current collector and the first current collector of the first battery unit, a second package body sandwiched between the first current collector of the first battery unit and the first current collector of the second battery unit, and a third package body sandwiched between the first current collector and the second current collector of the second battery unit;
  the first current collectors of the first and the second battery units and the second package body form an enclosed space for depositing the ion guiding layer therein; and
  a distance between the first active material layers of the first and the second battery units is 5-100 micrometers.

10. The lithium battery structure of claim 9, wherein the ion-transmission material is an inorganic solid electrolyte.

11. The lithium battery structure of claim 10, wherein the ion-transmission material further includes a liquid electrolyte, a gel electrolyte, an ionic liquid, an ionic liquid electrolyte or a combination thereof.

12. The lithium battery structure of claim 10, wherein the ion-transmission material further includes an adjusting material for contact surfaces, and the adjusting material is mainly composed of a polymer substrate capable of transmitting metallic ions inside the polymer substrate and an additive material capable of dissociating a lithium salt and being used as a plasticizer.

13. The lithium battery structure of claim 12, wherein the adjusting material further includes a crystallization inhibition material.

14. The lithium battery structure of claim 12, wherein the adjusting material further includes an ion supply material.

15. The lithium battery structure of claim 9, wherein the ion-transmission material is made of an adjusting material for contact surfaces and a dissociable lithium salt, and the adjusting material is mainly composed of a polymer substrate capable of transmitting metallic ions inside the polymer substrate and an additive material capable of dissociating a lithium salt and being used as a plasticizer.

16. The lithium battery structure of claim 15, wherein the adjusting material further includes a crystallization inhibition material.

* * * * *